United States Patent [19]

Katz

[11] Patent Number: 4,885,567
[45] Date of Patent: Dec. 5, 1989

[54] VEHICULAR BACK-UP LAMP ALARM DEVICE

[76] Inventor: Danny Katz, 60 Sutton Place, South, New York, N.Y. 10022

[21] Appl. No.: 348,076

[22] Filed: May 4, 1989

Related U.S. Application Data

[62] Division of Ser. No. 110,012, Oct. 19, 1987, abandoned.

[51] Int. Cl.⁴ .............................................. B60Q 1/26
[52] U.S. Cl. .................................... 340/463; 340/474
[58] Field of Search .................... 340/70, 75, 88, 326, 340/815.21

[56] References Cited

U.S. PATENT DOCUMENTS 1,656,821  1/1928  Hanson .................................. 340/88
3,564,497  2/1971  Gazzo .................................... 340/75
3,895,197  7/1975  Mizrahi ............................... 340/52 R

*Primary Examiner*—Joseph A. Orsino
*Assistant Examiner*—Jeffery A. Hofsass

[57] ABSTRACT

A vehicular back-up lamp alarm device, comprising a sonic element, such as a buzzer, which is an integral part of the lamp base or of socket for receiving it. The sonic element is connected so it will be in parallel with the back-up lamp. Alternatively, the sonic element may be an integral part of a socket converter having a conventional lamp base and socket, and connected in parallel with the electrical connections between such base and socket. As a result, the operating voltage which is applied to the back-up lamp when the vehicle is put into reverse gear will also cause the sonic element to emit an audible alarm.

2 Claims, 1 Drawing Sheet

VEHICULAR BACK-UP LAMP ALARM DEVICE

This application is a division of application Ser. No. 110,012, filed 10-19-87.

BACKGROUND OF THE INVENTION

1. Field of the Invention

This invention relates to vehicular warning devices, and particularly to a simple and economical device which provides an audible alarm upon actuation of the back-up lamps of a vehicle when the vehicle is put into reverse gear.

2. Description of the Related Arts

It has been recognized that in order to provide an appropriate warning when a vehicle such as a car or truck is put into reverse gear, an audible alarm as well as actuation of the back-up lamps should be provided. Many accidents have occurred because a pedestrian standing behind a vehicle did not see the back-up light because he was not facing the vehicle when it was placed into reverse gear. The prior art discloses various arrangements for providing such audible alarm. For example, U.S. Pat. No. 2,580,677, issued to B. H. Hadley, discloses an electromagnetically operated gong connected in parallel with a lamp, such combination being actuated when the vehicle gear shift is put into reverse. U.S. Pat. No. 2,775,751, issued to H. B. Gordon et al, discloses a buzzer mounted in the trunk compartment of an automobile and wired in parallel with the back-up lamps, so that it is simultaneously actuated therewith.

Despite the availability of such devices, use of audible back-up alarms in automobiles has remained minimal because of the expense and combersome rewiring required to install them. Such devices have been widely used on large trucks, where, since back-up vision of the driver is limited, all available safety measures must be taken despite the expense and the installation effort required. Even there, however, it would be advantageous to provide such an alarm with less expense and complicated installation procedures.

SUMMARY OF THE INVENTION

The invention provides a vehicular back-up lamp and alarm device which is little more expensive than a conventional back-up lamp and requires no extra installation effort whatever. Such device comprises an electrically operable sonic element, for example a buzzer, integrally mounted within the base of an otherwise conventional back-up lamp or within the socket in which such lamp base is received. Alternatively, the sonic element may be an integral part of a socket converter having a base for insertion in a conventional back-up lamp socket and further having a socket into which a conventional back-up lamp can be inserted, such socket converter having electrical connections therein between the base and socket thereof and to the sonic element so that when operating voltage is supplied to the base thereof it is conveyed to the socket thereof as well as to the sonic element. Thus, the sonic element will be electrically in parallel with a conventional lamp inserted in the socket of the socket converter and will be simultaneously actuated therewith by the operating voltage supplied to the base of the socket converter.

BRIEF DESCRIPTION OF THE DRAWINGS

The invention will now be described with reference to the embodiments thereof shown in the accompanying drawings, wherein.

DESCRIPTION OF THE PREFERRED EMBODIMENTS

Figure 1:
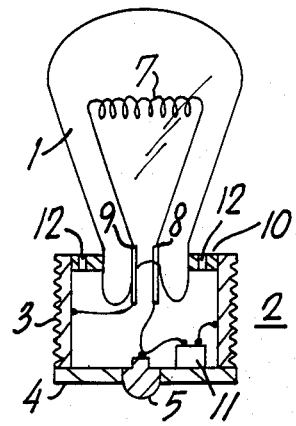
FIG. 1 shows a conventional back-up lamp base which has been modified in accordance with the invention to include a sonic element therein which is connected in parallel with the base.

Referring to FIG. 1, there is shown a back-up lamp bulb 1 supported in a cylindrical lamp base 2 which is adapted to be threadibly inserted in a back-up lamp socket such as is conventionally mounted in the rear fender of a vehicle (not shown). Lamp base 2 is shown as comprising an externally threaded cylindrical metallic shell 3 which is mounted on a lower insulating support member 4. In the center of and extending through support member 4 is a metallic contact button 5. The lamp bulb 1 is an evacuated glass envelope containing a filament 7, and terminates in a re-entrant stem through which extends electrodes 8, 9 which are connected to respective ends of filament 7. The bulb stem is sealed in a upper insulating support member 10 of lamp base 2. Contact button 5 is internally connected within the lamp base to electrode 8, and shell 3 is internally connected therein to electrode 9. As described thus far, the construction of lamp base 2 is altogether conventional, further details of such construction being well-known to those skilled in the field of electrical lamps. It should also be understood that lamp bulb 1 need not be an incandescent lamp bulb, but can also be a fluorescent lamp or other electroluminescent device having terminals to which a voltage may be applied for actuating such device.

In accordance with the invention, included within lamp base 2 and supported on the inner surface of insulating support member 4 thereof, is a electrically operable sonic element 11, such as a buzzer or tone generator, which produces a substantial audio alarm when energized by application thereto of a supply voltage the same as that for energizing lamp bulb 1, which is typically 12 volts d.c. Since lamp base 2 will be inserted into the back-up lamp socket of a vehicle, it may be advantageous to provide a number of apertures or perforations 12 in the insulating support 10 in which lamp bulb 1 is supported so that sound emitted by sonic element 11 can readily propagate through such apertures and easily be heard in the vicinity of the rear of the vehicle.

Figure 2:
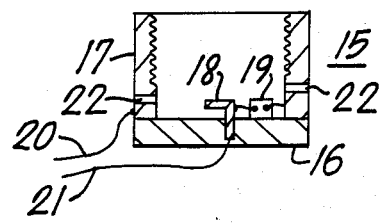
FIG. 2 shows a conventional back-up lamp socket which has been modified in accordance with the invention to include a sonic element therein which is connected in parallel with the socket.

FIG. 2 shows a conventional back-up lamp socket 1 comprising a lower insulating support 16 on which it is mounted a conductive shell 17 threaded on its inner surface to accept a correspondingly threaded lamp base inserted therein such as lamp base 2 in FIG. 1. Supported on insulating support member 16 within the socket is a contact spring member 18 which is contacted by contact button 5 of lamp base 2 when it is inserted in the socket 15. Contact spring 18 is wired to within socket 15 to one terminal of a sonic element 19, the other terminal of which is wired to socket shell 17. Sonic element 19 is supported on insulating support member 16. External wires 20, 21 for connecting socket 15 to the electrical back-up circuit of a vehicle, in conventional manner, are respectively soldered to the exterior of socket shell 17 and extend through base 16 to be soldered to contact spring 18. Thus, when operating voltage is applied to wires 20, 21, as will occur when the vehicle gear shift is put into reverse, such voltage will be supplied to sonic element 19 and between contact spring 18 and socket shell 17, so as to actuate a lamp inserted in the socket 15. To increase the volume of sound from sonic element 19 in the vicinity at the rear of the vehicle, apertures 22 may be provided at the bottom of socket shell 17, below the level thereof which is engaged by a lamp base inserted therein.

Figure 3:
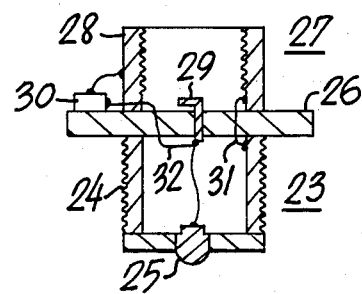
FIG. 3 shows a socket converter in accordance with the invention, comprising a base and a socket as well as a sonic element, all of which are electrically interconnected.

FIG. 3 shows an embodiment of the invention which is a socket converter, making it possible to utilize a completely conventional back-up lamp base and lamp socket without any modification thereof. Such socket converter comprises an conventional lamp base 23 having an externally threaded conductive shell 24 and a base contact button 25, and an insulating washer disc 26 affixed to and extending over the top of shell 24. On washer disc 26 is supported a conventional lamp socket 27 having an internally threaded conductive shell 28 and a base contact spring 29. Contact spring 29 is wired within base 23 to contact button 25, and shells 24 and 28 are internally connected by a wire 31 extending through washer disc 26. Washer disc is of somewhat greater diameter than shells 24 and 28, thereby providing space thereon for supporting a sonic element 30 which may be the same as sonic element 11 in FIG. 1. One terminal of sonic element 30 is wired to socket shell 28 and the other terminal thereof is connected to an insulated wire 32 which extends through a small aperture in shell 28, into socket 27, through a small aperture in washer disc 26, and is soldered to contact spring 29. Thus, socket shell 28 and lamp base shell 24 are electrically contiguous, and sonic element 30 is electrically connected between such shells and base contact button 25.

While the invention has been described with reference to certain preferred embodiments thereof, it will be apparent to those skilled in the art that various modifications and adaptations thereof may be made without departing from the teachings and scope of the invention as defined in the appended claims.

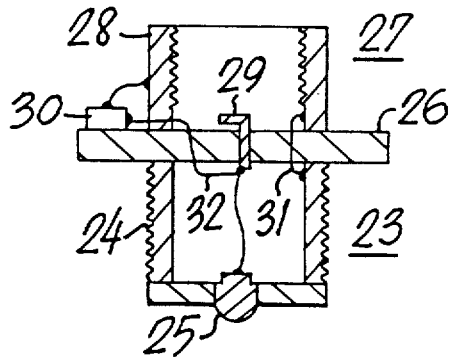

What is claimed is:

1. A socket converter forming a lamp alarm device, comprising: opposite disposed open and closed cylindrical shells affixed to a flat, thin insulating support member disposed between and isolating the shells which are electrically connected to each other, said shells and said insulating support of said socket converter forming a lamp base having a base contact button adapted to be inserted in a lamp socket and further forming a lamp socket with a base contact spring adapted to receive therein the base of a lamp bulb to be mated with said open cylindrical shell; a sonic element mounted on said insulating support member and having a pair of electrical conductors one of which is connected permanently to both said base contact button and said base contact spring and the other connected permanently to said open cylindrical shell.

2. An alarm device in accordance with claim 1, wherein said insulating support is a disc affixed between the lamp base and the lamp socket of said socket converter.

* * * * *

UNITED STATES PATENT AND TRADEMARK OFFICE
CERTIFICATE OF CORRECTION

PATENT NO. : 4,885,567

DATED : December 5, 1989

INVENTOR(S) : Danny Katz

Page 1 of 2

It is certified that error appears in the above-identified patent and that said Letters Patent is hereby corrected as shown below:

The title page should be deleted to appear as per attached title page.

Signed and Sealed this

Ninth Day of October, 1990

Attest:

HARRY F. MANBECK, JR.

*Attesting Officer*  *Commissioner of Patents and Trademarks*

United States Patent [19]

Katz

[11] Patent Number: 4,885,567

[45] Date of Patent: Dec. 5, 1989

[54] VEHICULAR BACK-UP LAMP ALARM DEVICE

[76] Inventor: Danny Katz, 60 Sutton Place, South, New York, N.Y. 10022

[21] Appl. No.: 348,076

[22] Filed: May 4, 1989

Related U.S. Application Data

[62] Division of Ser. No. 110,012, Oct. 19, 1987, abandoned.

[51] Int. Cl.⁴ .............................................. B60Q 1/26
[52] U.S. Cl. ...................................... 340/463; 340/474
[58] Field of Search ................ 340/70, 75, 88, 326, 340/815.21

[56] References Cited

U.S. PATENT DOCUMENTS

| | | | |
|---|---|---|---|
| 1,656,821 | 1/1928 | Hanson | 340/88 |
| 3,564,497 | 2/1971 | Gazzo | 340/75 |
| 3,895,197 | 7/1975 | Mizrahi | 340/52 R |

Primary Examiner—Joseph A. Orsino
Assistant Examiner—Jeffery A. Hofsass

[57] ABSTRACT

A vehicular back-up lamp alarm device, comprising a sonic element, such as a buzzer, which is an integral part of the lamp base or of socket for receiving it. The sonic element is connected so it will be in parallel with the back-up lamp. Alternatively, the sonic element may be an integral part of a socket converter having a conventional lamp base and socket, and connected in parallel with the electrical connections between such base and socket. As a result, the operating voltage which is applied to the back-up lamp when the vehicle is put into reverse gear will also cause the sonic element to emit an audible alarm.

2 Claims, 1 Drawing Sheet